United States Patent
Menzel

[15] 3,636,663
[45] Jan. 25, 1972

[54] APPARATUS FOR MATTING GLASS SLIDES

[72] Inventor: Gerhard Menzel, Braunschweig, Germany
[73] Assignee: Propper Manufacturing Company, Inc.
[22] Filed: Nov. 28, 1969
[21] Appl. No.: 880,585

[52] U.S. Cl. ............................................51/138, 51/140
[51] Int. Cl. .............................................B24b 21/04
[58] Field of Search ..........................51/138, 140, 216.6

[56] References Cited

UNITED STATES PATENTS

| | | | |
|---|---|---|---|
| 2,732,590 | 1/1956 | Clercq | 51/138 X |
| 1,936,075 | 11/1933 | Unsinger | 51/215.6 |
| 984,464 | 2/1911 | Bestgen | 51/140 |

Primary Examiner—Harold D. Whitehead
Attorney—Blum, Moscovitz, Friedman & Kaplan

[57] ABSTRACT

An apparatus for matting glass slides of the type used to carry specimens to be observed under a microscope, for example. The apparatus includes a conveyor belt having an upper run for moving the slides from a receiving end of the upper run to a discharge end thereof. At the receiving end of the upper run of the conveyor belt is a chute for supplying the slides to the belt with the slides each projecting by a predetermined distance laterally beyond a side edge of the upper run. Between the ends of the upper run of the conveyor belt is a pressure roller made of a soft elastic material for pressing against each slide as the latter moves beneath each pressure roller between the latter and the upper run of the conveyor belt. In alignment with this pressure roller, beyond the side edge of the upper run of the belt, is a high-speed grinding element situated to engage a surface of each slide as it moves beneath the pressure roller. At the discharge end of the belt is a receiving receptacle to which the ground slides are automatically delivered.

7 Claims, 2 Drawing Figures 3,636,663

INVENTOR.
GERHARD MENZEL
BY
Blum, Moscovitz, Friedman & Kaplan
ATTORNEYS

APPARATUS FOR MATTING GLASS SLIDES

BACKGROUND OF THE INVENTION

The present invention relates to the manufacture of glass slides of the type used for carrying specimens which are observed, for example, beneath a microscope.

In particular, the present invention relates to an apparatus for providing articles of this general type with matted surface areas. Such matted surface areas are desirable for the purpose of rendering such areas of the glass slide capable of receiving marks from a suitable writing instrument. If the surface area is not matted, it is not possible to write on the glass.

At the present time glass slides with matted areas are available. However in order to provide such glass slides it is necessary to subject them either to an etching treatment or to sandblasting. Both of these known methods are expensive and, where acids are required, there is the additional disadvantage of use of relatively dangerous materials in connection with the treatment.

SUMMARY OF THE INVENTION

It is accordingly a primary object of the present invention to provide an apparatus capable of manufacturing glass slides having matted areas while at the same time avoiding the above drawbacks.

In particular, it is an object of the invention to provide an apparatus which will operate very reliably to achieve glass slides which have matted areas of a preselected magnitude located at preselected portions of the glass slides.

In addition, it is an object of the invention to provide an apparatus of this type which is automated to such an extent that it is possible for a single operator to carry out all of the operations necessary to achieve the desired glass slides.

In particular, it is an object of the invention to provide an apparatus of the above general type which requires an operator only to supply glass slides to and to remove finished glass slides from the apparatus.

According to the invention the apparatus includes a conveyor belt having an upper run for moving the slides from a receiving to a discharge end of the belt, and a supply means is situated at the receiving end of the belt for supplying thereto glass slides in a position extending through a given extent beyond a side edge of the upper run of the belt. Between the ends of the belt there is a pressure roller of a soft elastic material which presses each glass slide against the upper run of the belt as each glass slide moves beneath this pressure roller. In alignment with the pressure roller, beyond the edge of the belt, is a high-speed grinding element situated in the path of movement of the surface of the slide as it moves beneath the pressure roller, so as to engage this surface and grind the latter, rendering the surface matted in this way. Each glass slide which has been treated in this manner continues to progress automatically toward the discharge end of the upper run of the conveyor belt, and at this discharge end is a receiving means which receives the glass slides which reach the discharge end of the conveyor belt.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
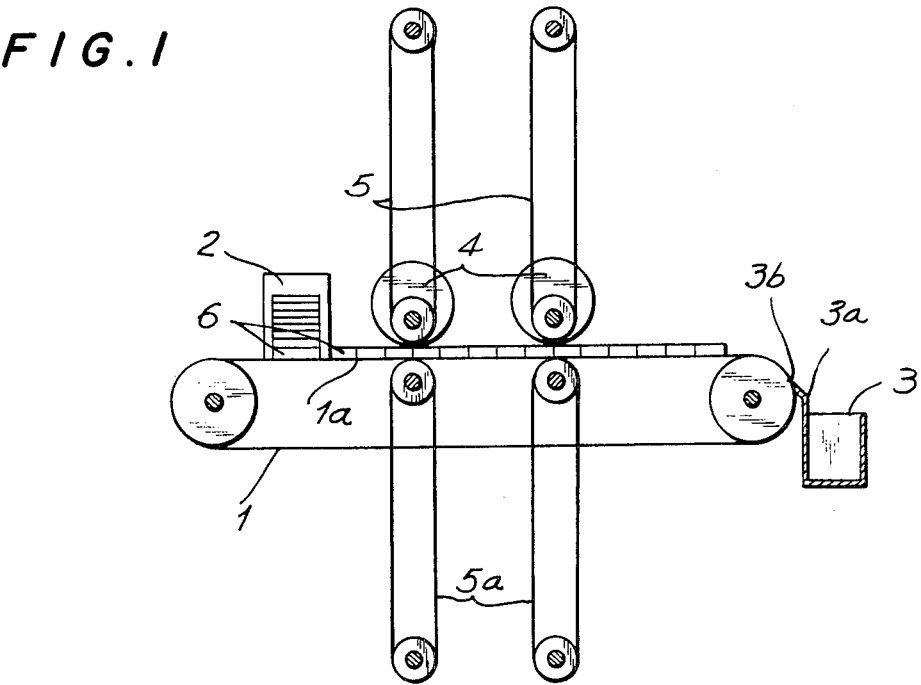
FIG. 1 is a schematic side elevation of an apparatus according to the invention.

Referring to the drawings, there is shown therein an endless conveyor belt 1 having an upper run provided with a left receiving end and a right discharge end, as viewed in the drawings. Over the left receiving end of the upper run of the conveyor belt 1 is a supply means 2 in the form of a chute or elongated hollow tube having an upper open end through which slides can be introduced into the guide tube or chute 2. This supply means has a configuration corresponding to that of the glass slides, and it is supported by any suitable unillustrated frame work in a manner which enables the supply means to be laterally adjusted as indicated by the double-headed arrow shown at the upper left portion of FIG. 2. In this way the extent to which the supply means 2 extends beyond the edge of the belt 1 shown at the lower part thereof in FIG. 2 can be regulated. The distance of the bottom end of the supply means 2 from the upper surface of the upper run of the belt 1 is such that the movement of the upper run of the belt, by frictional engagement with the bottom surface of each slide, results in displacement of the slides one by one out of the bottom end of the tube or chute which forms the supply means 2. Thus, in accordance with the adjustment of this supply means each glass slide will be transported by the upper run of the belt 1 from the receiving end toward the discharge end thereof with a predetermined portion of each glass slide extending laterally beyond the side edge of the belt 1 as explained above.

Figure 2:
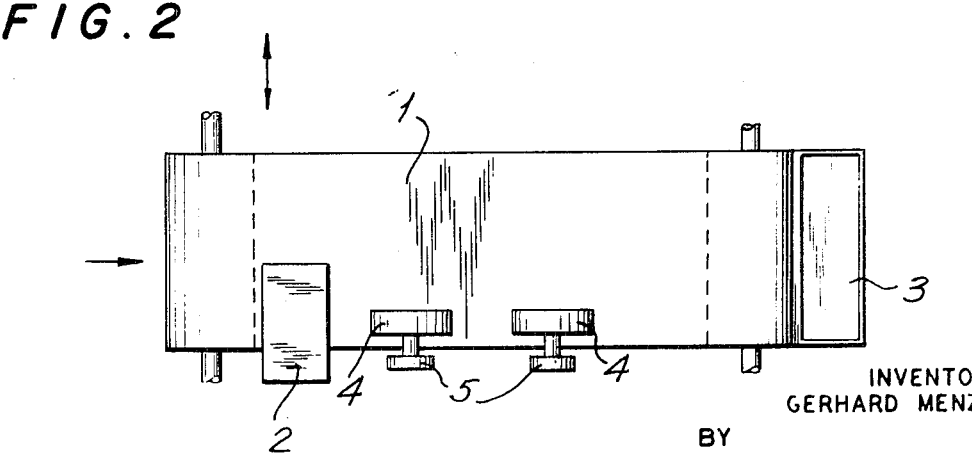
FIG. 2 is a schematic top plan view of the apparatus of FIG. 1.

At the delivery end of the belt 1 is a receiving means 3 in the form of a container having an open top and providing at its left wall, as viewed in FIGS. 1 and 2, with a curved portion 3a which extends around the upper right portion of the belt 1 at the discharge end thereof. This wall 3a terminates in a springy tongue 3b which directly engages the surface of the belt 1 at its discharge end and at its upper run for the purpose of positive removing the slides 6 therefrom as the slides reach the discharge end of the upper run of the belt 1.

In the illustrated example the upper run 1a of the belt 1 moves beneath a pair of driven pressure rollers 4 made of a soft elastic material such as, for example, foam rubber.

High-speed grinding elements 5 are situated beyond the edge of the belt 1 shown at the lower part of FIG. 2. These grinding elements 5 are, in the illustrated example, in the form of endless grinding belts, and they are carried by suitable pulleys and driven through any suitable drive. The soft pressure rollers 4 also may be independently driven, although they can turn simply from frictional engagement with the belt 1 or the slides 6 thereon.

As is illustrated in FIG. 1, it is possible to situate opposite the upper grinding belts 5 a pair of identical grinding belts 5a the upper ends of which are spaced beneath the lower ends of the belts 5 by a distance equal to the thickness of the slides 6. For this purpose the upper and/or lower grinding belts 5, 5a can be adjustable in elevation, and these lower belts 5a can also be driven in any suitable way so as to form the high-speed grinding elements.

The slides 6 delivered from the supply means 2 by movement of the belt 1 with respect thereto reach the pair of pressure rollers 4 so as to be successively pressed thereby against the upper surface of the upper run of the conveyor belt 1. While each slide is pressed against the belt 1 by a pressure roller 4, an exterior surface of each slide is ground by a belt 5 and/or 5a. It is thus possible to grind an upper surface and/or a lower surface of each slide at a selected location over an area determined by the width of the high-speed grinding elements 5, 5a. Thus, the location of the matted portion of each slide will be determined by the extent to which the supply means 2 extends laterally beyond the side edge of the conveyor belt 1.

The slides which are matted on one or both sides reach the removing tongue 3b of the receiving means 3 to be removed thereby and guided along the curved wall 3a into the container which forms the receiving means 3. After the latter has been filled to the desired extent it can be removed, and for this purpose it may be supported on any suitable rollers or the like so that it can be laterally moved away and replaced by an empty receptacle.

The entire apparatus operates automatically and because of its construction is absolutely reliable. It is possible for only one person to be present during the entire operations, and such a person is required only to fill the supply means 2 with slides which are to be matted ans to remove container 3 when it has been filled to a given extent. Thus, at predetermined moments such an operator will be required only to supply new slides and remove matted slides from the apparatus. The transversely movable container 3, after it is removed from the location at the discharge end of the belt 1, can transport the articles to any desired location, as to suitable packing installations.

Thus, according to the method of the invention the matted surface of the glass slide is achieved by grinding the glass slide, so that in this way disadvantages inherent in etching or sandblasting are avoided. Also, the article of the invention resulting from grinding of the surface of the glass slide provides the article with a matted appearance where the ground surface of the article is vastly superior to the surface resulting from conventional etching and sandblasting.

What is claimed is:

1. In an apparatus for matting selected areas of glass slides, a conveyor belt having an upper run for conveying the slides which move with said upper run in a given direction from a receiving end to a discharge end thereof, supply means situated over said receiving end of said upper run for supplying thereto glass slides positioned on said upper run with portions of said slides extending laterally beyond a side edge of said upper run of said belt, a rotary pressure roller of soft, elastic material engaging said upper run between said ends thereof for yieldably pressing against said upper run a portion of each slide, as it moves beneath said pressure roller, at least one high-speed grinding element having a grinding surface parallel to said upper run of said conveyor belt, said grinding element being laterally aligned with said pressure roller and situated beyond said side edge of said belt along the path of movement of a surface of that part of each slide which is parallel to said upper run of said belt and extends beyond said edge of said belt for grinding each slide at a part of said surface thereof as it moves beneath said pressure roller, and receiving means situated at said discharge end of said upper run of said belt for receiving the ground slides therefrom.

2. The combination of claim 1 and wherein said grinding element is itself in the form of an endless grinding belt.

3. The combination of claim 1 and wherein said receiving means is in the form of a container removably situated at said discharge end of said belt.

4. The combination of claim 1 and wherein there are a pair of said pressure rollers and a pair of said grinding elements respectively aligned therewith for successively engaging each slide as it is conveyed by said upper run of said belt toward said discharge end thereof.

5. The combination of claim 1 and wherein there are a pair of said grinding elements situated one over the other and spaced from each other by a distance corresponding to the thickness of each slide for simultaneously grinding each slide at its opposed surfaces while each slide moves beneath said pressure roller.

6. The combination of claim 1 and wherein said supply means is laterally adjustable for determining the extent to which each slide extends beyond said edge of said upper run of said conveyor belt.

7. The combination of claim 1 and wherein said receiving means is in the form of a receptacle for receiving the ground slides, said receptacle having a wall extending in part around said belt at said discharge end thereof and terminating in a springy tongue engaging said belt at said discharge end thereof for removing the ground slides from said belt.

* * * * *